Jan. 31, 1967 R. B. HANSEN 3,301,943
COLOR TELEVISION RECEIVER BIASING ARRANGEMENT
Filed Sept. 29, 1964
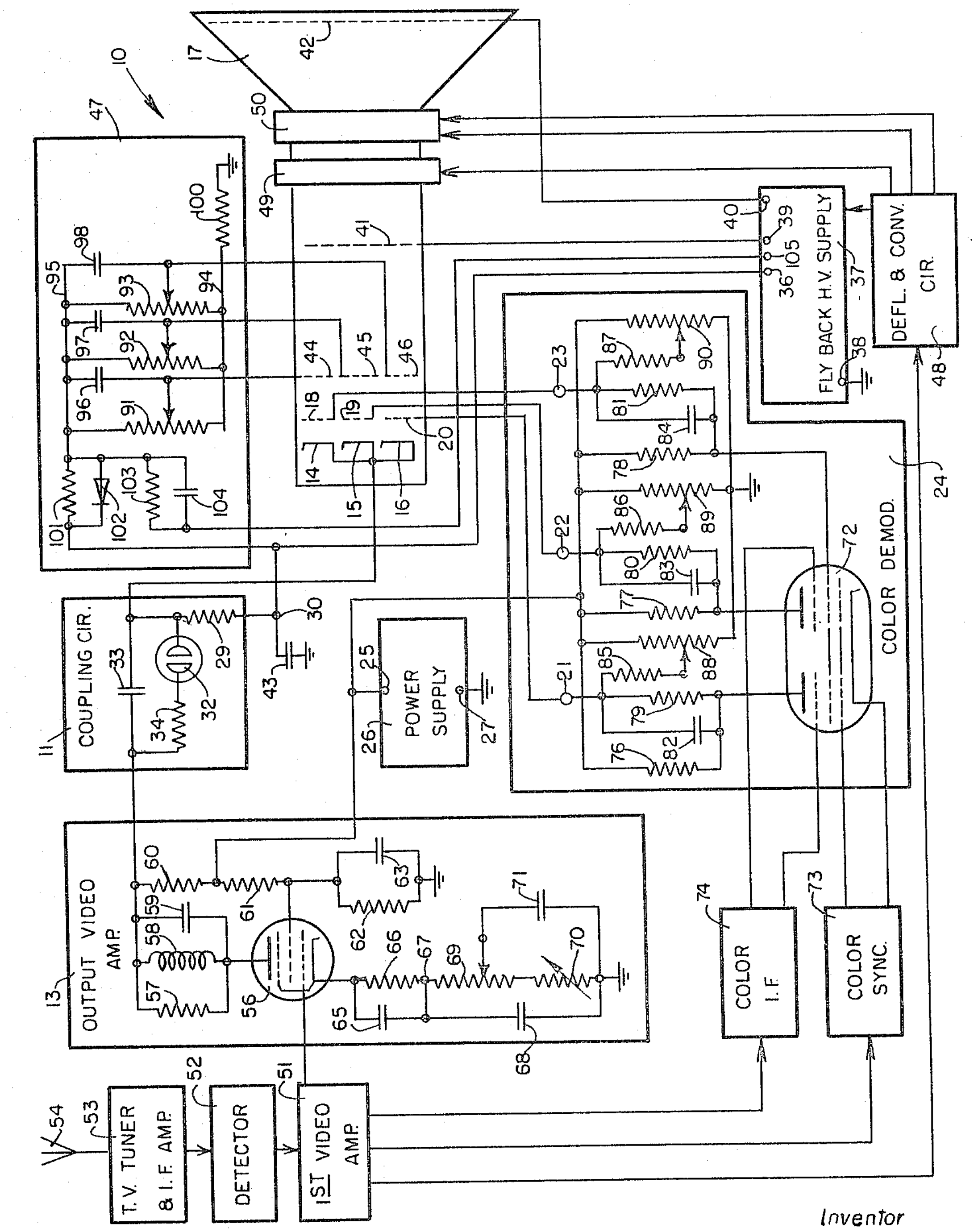
Inventor
Robert B. Hansen
By Mueller & Aichele
Attys.

United States Patent Office 3,301,943
Patented Jan. 31, 1967

3,301,943
COLOR TELEVISION RECEIVER BIASING ARRANGEMENT

Robert B. Hansen, Arlington Heights, Ill., assignor to Motorola, Inc., Franklin Park, Ill., a corporation of Illinois Filed Sept. 29, 1964, Ser. No. 400,141
8 Claims. (Cl. 178—5.4)

This invention relates to a color television receiver and more particularly to a color television receiver having coupling circuits which provide D.C. coupling while establishing optimum bias levels. The circuits provide excellent performance characteristics and are highly reliable and efficient in operation, while at the same time being relatively simple and inexpensive.

The invention was evolved with the general object of overcoming certain problems encountered in the coupling of cathodes and grids of electron guns of a tri-color kinescope to an output of a video signal amplifier and outputs of a color signal demodulator circuit, although it will be appreciated that various features of the invention have other applications. In such coupling circuits, it is desirable to provide D.C. coupling for optimum performance, and it is also desirable that the grids be operated at certain negative bias levels with respect to the cathodes. With prior circuits, the fulfillment of such conditions has imposed certain requirements with respect to the design of the amplifier and demodulator circuits and with respect to the supply of operating voltages to the vacuum tubes of such circuits.

It has generally been necessary to apply voltages in a manner such as to develop a relatively high voltage at the plate of a final amplifier tube of the video amplifier while developing a relatively low voltage at output electrodes of tubes of the color demodulator circuit, in order to provide D.C. coupling while obtaining the desired bias levels. Various D.C. restoration circuits have also been used in an attempt to obtain performance equivalent to that obtained with the D.C. coupling, but such circuits have been expensive and not always stable and reliable in operation. In many cases, performance and reliability have been compromised in order to minimize the expense of construction of the circuits.

According to this invention, a coupling circuit is provided between the output terminal of a video amplifier and cathodes of a color cathode ray kinescope tube for providing D.C. signal coupling while biasing the cathodes at a higher positive potential level than that of the output terminal of the video amplifier. With this arrangement, the control grids of the kinescope can be directly coupled to output terminals of a color demodulator circuit, so that D.C. coupling is provided for both the luminance or video signal and the color signals. At the same time, the design of the video amplifier and color demodulator circuits is simplified and power supply requirements are much less stringent. It is possible to use a relatively low power supply voltage for both circuits, with output terminals of both the video amplifier and the color demodulator being operated at voltages of the same order of magnitude. By way of example, a power supply voltage for vacuum tubes of both circuits may be used having an output voltage on the order of 275 volts, obtainable from a voltage multiplier supply circuit, without using a power transformer.

An important feature of the invention is in the provision of a direct current conductive impedance between the output terminal of the video amplifier and the cathodes of the kinescope, for providing D.C. signal coupling, and in the provision of resistance means between the cathodes of the kinescope and the high voltage supply for the kinescope, for establishing the desired positive bias level at the cathodes.

Another important feature of the invention is in the provision of a voltage regulator device, preferably a neon bulb, for maintaining at a substantially constant value, the voltage between the output terminal of the video amplifier and the cathodes of the kinescope. With such a device, the full D.C. component is applied from the output of the video amplifier to the kinescope.

Still another feature of the invention is in the provision of a capacitor between the output terminal of the video amplifier and the cathodes of the kinescope for efficient coupling of A.C. components of the video signal.

A specific feature of the invention is in the provision of a resistor in series with the neon tube for preventing relaxation oscillations such as might otherwise occur through discharge of the capacitor through the neon bulb.

This invention contemplates other and more specific objects, features and advantages which will become more fully apparent from the following detailed description taken in conjunction with the accompanying drawing, wherein the single figure is a schematic circuit diagram of the color television receiver including coupling circuits constructed according to the principles of this invention.

With reference to the drawing, reference numeral 10 generally designates a television receiver which in accordance with the principles of the invention comprises a coupling circuit 11 between an output terminal 12 of an output video amplifier 13 and cathodes 14–16 of electron guns of a tri-color cathode ray kinescope 17.

The coupling circuit 11 provides D.C. signal coupling between output terminal 12 and cathodes 14–16 while biasing the cathodes 14–16 at a higher positive potential level than that of the output terminal 12. Control grids 18–20 of the kinescope 17 are directly coupled to output terminals 21–23 of a color demodulator circuit 24, with D.C. coupling being thus provided for both the luminance or video signal and the color signals.

The output video amplifier 13 and the color demodulator circuit 24 are both connected to a positive output terminal 25 of a D.C. power supply 26 having a grounded terminal 27, and the D.C. voltage levels at the output terminal 12 of the video amplifier 13 and at the output terminals 21–23 of the color demodulator 24 are all of the same order of magnitude, which is possible since the necessary bias for the grid-cathode circuits of the kinescope 17 is supplied through the coupling circuit 11. By way of example, the power supply 26 may supply a voltage of approximately 280 volts and is preferably a transformer-less voltage doubler supply operated from a 120-volt A.C. power line. Other types of power supplies may be used, but in any case the power supply requirements are less stringent by virtue of the supply of kinescope bias through the coupling circuit 11.

In accordance with important features of the invention, the cathodes 14–16 are connected through a resistor 29 to a circuit point 30, supplied with a D.C. voltage substantially higher than the level of the D.C. voltage at the output terminal 12, and a direct current conductive impedance is provided between output terminal 12 and cathodes 14–16, preferably including a voltage regulator device in the form of a neon bulb 32.

Neon bulb 32 is operated within a range such as to maintain the voltage thereacross substantially constant and to apply substantially the full D.C. components and low frequency A.C. components of the video signal from the output terminal 12 to the cathodes 14–16. By way of example, the neon bulb may be operated at a regulated voltage of 90 volts.

For coupling of higher frequency A.C. components of the video signal, a capacitor 33 is connected between the terminal 12 and the cathodes 14–16 in parallel relation to the neon bulb 32. Because of the neon bulb 32, the capacitor 33 may have a value substantially less than that which would be otherwise required. For example, the capacitor may have a value of 0.01 microfarad, whereas a value of 0.1 microfarad or higher might otherwise be required. This is advantageous, since there is less energy stored and less chance of burning a hole in the screen of the kinescope, when the receiver is deenergized.

To prevent relaxation oscillations in the coupling circuit 11, such as might otherwise occur from discharge of the capacitor 33 through the neon bulb 32, a resistor 34 is connected in the circuit, preferably in series with the neon bulb 32, to reduce the "Q" of the circuit to a value below that required for oscillation.

Circuit point 30 is connected to a terminal 36 of a flyback high voltage supply 37 having a grounded terminal 38 and having termianls 39 and 40 connected to a focus grid 41 and a screen 42 of the kinescope 17. The terminal 36 is preferbaly connected to a tap of the supply 37 to supply a voltage much lower than that supplied from terminal 40 to the screen 42, but substantially higher than the D.C. voltage level at the output terminal 12 of the video amplifier 13. By way of example, the voltage at the terminal 40 may be 26 kilovolts while the voltage at terminal 36 may be approximately 700 volts. The bootstrap potential at point 30 serves to fire bulb 32.

Circuit point 30 is additionally connected to accelerating grids 44–46 of the kinescope 17, through a balance adjusting circuit 47 described in detail below.

As diagrammatically illustrated, the flyback high voltage supply 37 is energized in conventional fashion from deflection and convergence circuits 48, which are connected to a convergence coil assembly 49 and horizontal and vertical deflection coils 50 of the kinescope 17. The deflection and convergence circuits 48 respond to synchronizing signals obtained from a first video amplifier 51 having an input connected to the output of a detector 52, the input of the detector 52 being connected to the output of a TV tuner and IF amplifier 53 connected to an antenna 54. It will be understood that circuits 37, 48 and 51–53 may be of known constructions and are therefore not illustrated in detail.

The output video amplifier 13 comprises a pentode vacuum tube 56 having a grid connected to an output from the first video amplifier 51. The plate of tube 56 is connected to output terminal 12 through a peaking circuit including a resistor 57, an inductor 58 and a capacitor 59 in parallel, a direct current conductive path being thus provided between the plate and the output terminal 12. Output terminal 12 is connected through a resistor 60 to the output terminal 25 of power supply 26, to supply a plate voltage for the tube 56.

The screen grid of the tube 56 is connected to terminal 25 through a resistor 61 and to ground through the parallel combination of a resistor 62 and a capacitor 63. The cathode tube 56 is connected through the parallel combination of a capacitor 65 and a resistor 66 to a circuit point 67 which is connected to ground through a capacitor 68 and also through a potentiometer 69 and adjustable resistor 70 in series, with a capacitor 71 being connected between the movable contact of potentiometer 69 and ground. Potentiometer 69 forms a contrast control, while resistor 70 forms a brightness control in the D.C. path to cathodes 14–16.

The illustrated color demodulator 24 comprises a vacuum tube 72 having two sections with a common cathode and a common control grid being connected to output terminals of a color synchronizing circuit 73 and with separate grids of the two sections being connected to the outputs of a color IF circuit 74, circuits 73 and 74 being connected to outputs of the video amplifier 51. The color synchronizing circuit 73 supplies a 3.58 MC signal synchronized with the burst portion of the received signal, while circuit 74 supplies color information signals separated from the video signal through a band pass filter in the first video amplifier 51.

Separate plates of the two sections of the tube 72 and a common grid of the two sections are respectively connected to the output terminal 25 of the power supply 26 through resistors 76–78, and are also respectively connected to output terminals 21 and 24 through resistors 79–81 and capacitors 82–84. Output terminals 21–23 are also connected through resistors 85–87 to the movable contacts of potentiometers 88–90, connected between ground and the terminal 25 of the power supply 26.

In operation, the tube 72 responds to signals from circuits 73 and 74 to supply green, red and blue color difference signals at grids 18–20, potentiometers 88–90 being adjustable to obtain the desired signal level. It will be noted that this circuit provides direct current conductive paths through resistors 79–81 between output electrodes of the vacuum tube 72 and the kinescope grids 18–20, such electrodes being also connected to the power supply terminal 25 through the resistors 76–78. It may be noted that the illustrated circuit is a simplified version of an actual circuit having additional refinements to obtain more accurate reproduction. It is also noted that other types of color demodulator circuits may be employed.

The balance adjustment circuit 47 comprises potentiometers 91–93, conneced between lines 94 and 95 and having movable contacts connected to grids 44–46 and through capacitors 96–98 to the line 95. Line 94 is connected to ground through a resistor 100, while line 95 is connected to circuit point 30 through the parallel combination of a resistor 101 and a diode 102. Potentiometers 91–93 are adjustable to adjust the relative D.C. voltages applied to grids 44–46. For blanking, line 95 is connected through the parallel combination of a resistor 103 and a capacitor 104 to a terminal 105 of the flyback high voltage supply, which supplies a negative voltage during flyback intervals to cut off the electron guns of the kinescope. Diode 102 prevents a potential of line 95 from rising appreciably above that of the circuit point 30 during voltage transients.

It will be understood that modifications and variations may be effected without departing from the spirit and scope of the novel concepts of this invention.

I claim as my invention:

1. In a color television receiver, video amplifier means having an output terminal, color demodulator means having a plurality of output terminals, a color cathode ray tube having a plurality of cathodes and associated control grids, direct current coupling means between said color demodulator means output terminals and said control grids, and coupling means connected between said output terminal of said video amplifier means and said cathodes for providing direct current signal coupling while biasing said cathodes at a higher positive potential level than that of said output terminal of said video amplifier means.

2. In a color television receiver, video amplifier means having an output terminal, color demodulator means having a plurality of output terminals, power supply means connected to said video amplifier means and said color demodulator means and operative to establish D.C. voltage levels of the same order of magnitude at all of said output terminals, a color cathode ray tube having a plurality of cathodes and associated control grids, direct current coupling means between said color demodulator means output terminals and said control grids, and coupling means connected between said output terminal of said video amplifier means and said cathodes for providing direct current signal coupling while biasing said cathodes at a higher positive potential level than that of said output terminals of said video amplifier means.

3. In a color television receiver, video amplifier means having an output terminal, color demodulator means having a plurality of output terminals, a color cathode ray tube having a plurality of cathodes and associated control grids, direct current coupling means between said color demodulator means output terminals and said control grids, and coupling means connected between said output terminal of said video amplifier means and said cathodes for providing direct current signal coupling while biasing said cathodes at a higher positive potential level than that of said output terminal of said video amplifier means, said coupling means comprising a voltage regulator device for maintaining the voltage between said output terminal of said video amplifier means and said cathodes substantially constant.

4. In a color television receiver as defined in claim 3, said voltage regulator device being a neon bulb.

5. In a color television receiver, video amplifier means having an output terminal, color demodulator means having a plurality of output terminals, a color cathode ray tube having a plurality of cathodes and associated control grids, direct current coupling means between said color demodulator means output terminals and said control grids, and coupling means connected between said output terminal of said video amplifier means and said cathodes for providing direct current signal coupling while biasing said cathodes at a higher positive potential level than that of said output terminal of said video amplifier means, said coupling means comprising means for defining a direct current conductive path for D.C. and low frequency A.C. signal coupling, and a capacitor for higher frequency A.C. signal coupling.

6. In a television receiver including a cathode ray tube, video amplifier means having an output terminal, a high voltage power supply for said cathode ray tube, a low voltage power supply for said video amplifier means, a voltage regulator device having first and second terminals, means connecting said first terminal to said output terminal of said video amplifier means, resistance means connecting said second terminal to said high voltage supply to develop a constant voltage between said first and second terminals of said device, and means connecting said second terminal to said cathode ray tube to thereby apply a video signal from said output terminal to said cathode ray tube with D.C. coupling but at a different potential level than that of said output terminal.

7. In a television receiver including a cathode ray tube, video amplifier means having an output terminal, and coupling means between said output terminal and said cathode ray tube comprising a capacitor, a voltage regulator device connected in parallel relation to said capacitor, and a resistor in series with said voltage regulator device and said capacitor for preventing relaxation oscillations.

8. In a color television receiver, video amplifier means having an output terminal, color demodulator means having a plurality of output terminals, a color cathode ray tube having a plurality of cathodes and associated control grids, direct current coupling means between said color demodulator means output terminals and said control grids, and coupling means connected between said output terminal of said video amplifier means and said cathodes for providing direct current signal coupling while biasing said cathodes at a higher positive potential level than that of said output terminal of said video amplifier means, said video amplifier means comprising a vacuum tube having an output electrode, and a direct current conductive connection between said output electrode and said output terminal, and said demodulator means comprising vacuum tube means having a plurality of output electrodes, and direct current conductive means between said output electrodes and said output terminals.

References Cited by the Examiner

UNITED STATES PATENTS

| | | | |
|---|---|---|---|
| 2,525,106 | 11/1950 | Wendt | 178—7.3 |
| 3,249,693 | 5/1966 | Suhrmann | 178—7.5 |

FOREIGN PATENTS

| | | |
|---|---|---|
| 727,766 | 6/1932 | France. |

JOHN W. CALDWELL, *Acting Primary Examiner.*

J. A. O'BRIEN, *Assistant Examiner.*